United States Patent [19]
Wade

[11] Patent Number: 5,263,048
[45] Date of Patent: Nov. 16, 1993

[54] NARROW BAND INTERFERENCE FREQUENCY EXCISION METHOD AND MEANS

[75] Inventor: Bobby R. Wade, Fort Wayne, Ind.

[73] Assignee: Magnavox Electronic Systems Company, Fort Wayne, Ind.

[21] Appl. No.: 920,215

[22] Filed: Jul. 24, 1992

[51] Int. Cl.$^5$ ............................................. H04K 1/00
[52] U.S. Cl. ............................... 375/1; 380/34; 375/57; 375/58; 375/99; 455/63
[58] Field of Search ............... 375/1, 51, 57, 58, 99, 375/100, 101, 102, 103; 455/63, 222, 223, 224, 295, 296, 307; 380/34; 364/726, 827

[56] References Cited

U.S. PATENT DOCUMENTS

| | | | |
|---|---|---|---|
| 4,351,062 | 9/1982 | Yoshiya | 375/99 |
| 4,962,508 | 10/1990 | Kingston | 375/1 |
| 5,018,088 | 5/1991 | Higbie | 375/1 X |
| 5,029,184 | 7/1991 | Andren et al. | 375/1 |
| 5,151,920 | 9/1992 | Haagh et al. | 375/1 |

OTHER PUBLICATIONS

"An FFT Based Technique for Surpressing Narrow-Band Interference . . . ", Dipietro, Robert C.; IEEE, CH2673-2/89/0000-1360; Feb. 1989.

*Primary Examiner*—Tod R. Swann
*Attorney, Agent, or Firm*—John H. Crozier; Richard T. Seeger

[57] ABSTRACT

In a preferred embodiment, a method for excising narrow band interferers in a spread spectrum signal communication which includes the steps of: receiving the spread spectrum signal; digitizing the spread spectrum signal; transforming the digitized signal from the time domain to the frequency domain; discarding the magnitude of the digitized signal and replacing it with a normalized value; and transforming the digitized signal back to the time domain.

14 Claims, 2 Drawing Sheets

NARROW BAND INTERFERENCE FREQUENCY EXCISION METHOD AND MEANS

BACKGROUND OF THE INVENTION

1. Field of the Invention

The present invention relates to radio signals generally and, more particularly, but not by way of limitation, to novel method and means for narrow band interference frequency excision via phase domain normalization.

2. Background Art

Spread spectrum (SS) communication systems are becoming more prevalent for the secure transmission of radio signals. SS or pseudonoise (PN) modulation is employed in digital communication systems to reduce the effects of interference due to other users and intentional jamming of the radio signals. When the interference is narrow-band, the cross correlation of the received signal with the replica of the PN code sequences reduces the level of interference by spreading it across the frequency band occupied by the PN signal. Thus, the interference is rendered equivalent to a lower level noise with a relatively flat spectrum. Simultaneously, the cross correlation operation collapses the desired signal to the bandwidth occupied by the information signal prior to spreading.

The interference immunity of a PN SS communication system corrupted by narrow band interference can be further improved by filtering the signal prior to cross correlation, where the objective is to reduce the level of the interference at the expense of introducing some distortion to the desired signal. Such a technique is described in "An FFT Based Technique for Suppressing Narrow-Band Interference in PN Spread Spectrum Communications Systems," by Robert C. DiPietro, IEEE, CH2673-2/89/0000-1360 February 1989.

In a typical frequency spectrum, a spread spectrum PN signal is placed at a level below a noise floor which makes detection or interception of the signal significantly more difficult. This spread signal is recoverable in the presence of typical interferers. When a strong interfering signal is present, the desired signal cannot be recovered. Obviously, the SS communication system can be enhanced if the interfering signals can be removed or suppressed.

There is a variety of methods for excising such interfering signals. These fall into two general categories: transient excision and frequency excision.

In the transient methods, the signal (usually analog) is passed through a narrow band notch filter or filters. This method is typically implemented by surface acoustical wave-type technology (surface acoustical waves, acoustic charged transports, or charge-coupled devices). Some estimate of the interfering signal's (or signals') frequency (or frequencies) is made. From this information, narrow band notches are placed at the interfering signals. (A set of phase lock loops could also be used to track out the interfering signals.)

The frequency domain excision category usually involves a digital processing approach. The transient signal is digitized and processed through a Fourier Transform to the frequency domain. In the frequency domain, there are several algorithms to suppress interfering signals. Three types of algorithms are generally recognized. The first method is similar to the time domain method. A filter is applied to the frequency data to suppress the interfering signal(s). The second method simply looks at the magnitude of the signals in the frequency domain, compares the magnitude to a threshold or the noise level, and either zeroes the frequency bins corresponding to the interfering signals or adjusts the signal to the level relative to the noise floor. The third algorithm involves calculating the magnitude of each frequency bin and dividing each frequency bin by its magnitude. Since the information of the SS signal is contained in the phase of the signal, only the interfering signals are affected. The resultant spectrum is normalized to unity magnitude. The phase remains unchanged. A plot of the magnitude response is a rather uninteresting straight line.

The conventional methods of frequency excision noted above have several disadvantages. They cannot be implemented in real time hardware (i.e., each data sample is operated on for its interfering components) or the uses of any real time implementations are very limited. They require that estimates be made of the spectrum to adjust a clipping (threshold) level or noise estimation. They require computation processes or comparisons that require mathematical overhead, such a digital signal processing procedure.

Accordingly, it is a principal object of the present invention to provide method and means for narrow band frequency excision in real time.

It is a further object of the invention to provide such method and means that do not require estimates to be made of the spectrum to adjust a clipping level or noise estimation.

It is an additional object of the invention to provide such method and means that do not require complex mathematical procedures.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method for excising narrow band interferers in a spread spectrum signal communication, comprising the steps of: receiving said spread spectrum signal; digitizing said spread spectrum signal; transforming said digitized signal from the time domain to the frequency domain; discarding the magnitude of said digitized signal and replacing it with a normalized value; and transforming said digitized signal back to the time domain.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
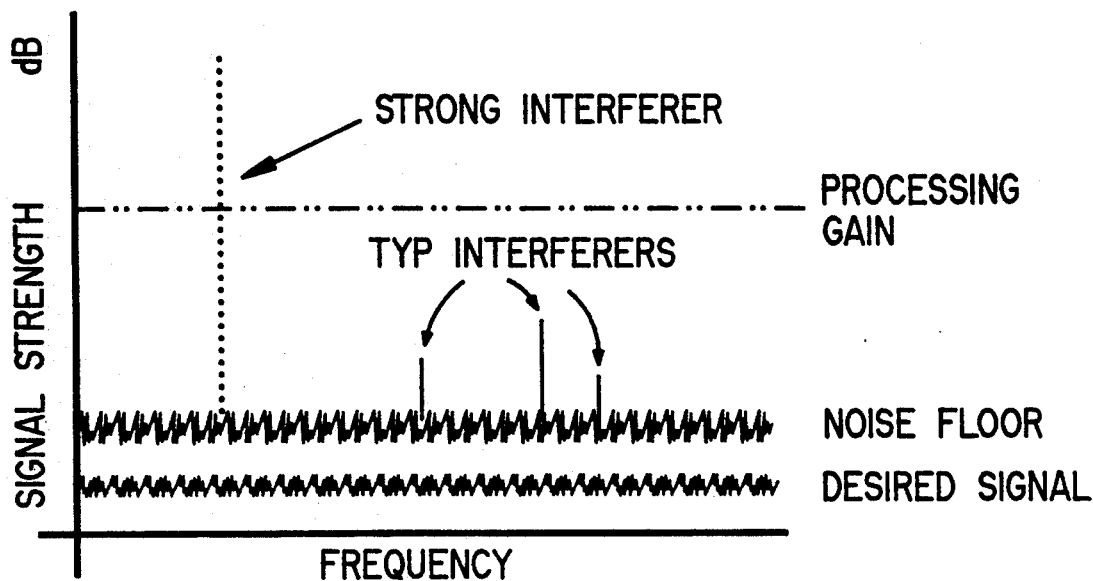
FIG. 1 illustrates a typical frequency spectrum with a SS signal.

Reference should now be made to the drawing figures, on which similar or identical elements are given consistent identifying numerals throughout the various figures thereof, and which parenthetical references to figure numbers direct the reader to the view(s) on which the element(s) being described is (are) best seen, although the element(s) may be seen also on other views.

The present invention focuses on the above-mentioned third method to accomplish frequency domain excision. The resultant frequency spectrum is normalized to unity magnitude, with the phase remaining unchanged. A plot of the magnitude response is a rather uninteresting straight line, with the amplitude of any interferers no greater than that of the SS signal.

FIG. 1 illustrates a typical frequency spectrum. As shown on FIG. 1, the desired SS signal is desirably below the noise floor present to make detection or interception of the signal significantly more difficult than if the signal were above the noise floor. The "STRONG INTERFERER" indicated could be a jamming signal or the signal from a TV or radio station or any co-located (i.e., nearby) communications. The "TYP INTERFERERS" indicated could be produced from low power sources, such as ham radios. The broken line titled "PROCESSING GAIN" represents the level of the SS PN signal when it is collapsed (not spread).

Figure 2:
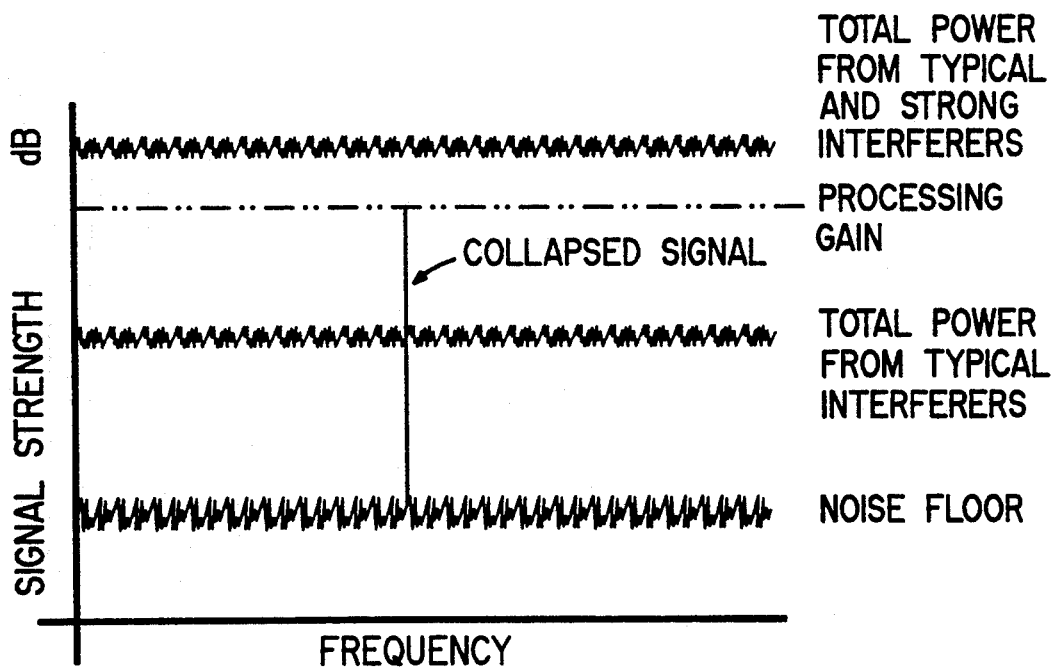
FIG. 2 illustrates the spectrum of FIG. 1 after the correlation (despreading) of the SS signal.

FIG. 2 illustrates the spectrum shown on FIG. 1 after the correlation (despreading) of the signal. As noted above, the collapsed signal can be recovered in the presence of interferers by one of the conventional methods described above. As also noted above, those conventional methods have certain disadvantages.

Figure 3:
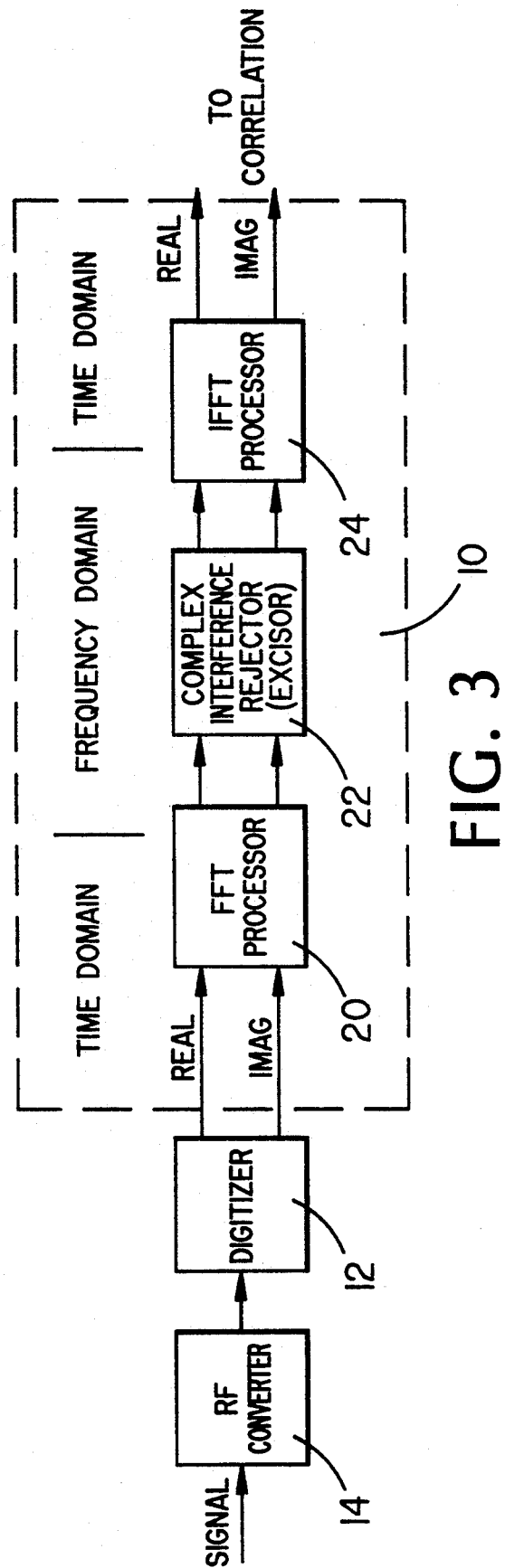
FIG. 3 is a block diagram of a frequency excision system according to the present invention.

With reference now to FIG. 3, the present invention overcomes these disadvantages through the use of real time adaptive filtering through fast Fourier transform (FFT) technology. This is accomplished by providing the signal processing system shown as reference numeral 10. System 10 comprises FFT circuitry 20, which receives input signals, and which is coupled to excision circuitry 22. Excision circuitry 22 is coupled to inverse FFT (IFFT) circuitry 24 which provides outputs to conventional correlation circuitry (not shown).

In operation, FFT circuitry 20 receives in-phase and quadrature (I and Q) signal inputs from a digitizer 12 which, in turn, receives an input from an RF converter 14. FFT circuitry 20 transforms the signals to the frequency domain. Once the data is in the frequency domain, the magnitude thereof is discarded and replaced with a normalization value and the narrow band interferers are rejected. The data is then transformed back to the frequency domain and processed through IFFT 24 to the time domain.

The excision process works because of the mannerism of SS signals. SS signals are modulated by phase modulation. The excision process performs a type limiting operation commonly associated with FM detection. By performing the excision operation in the frequency domain, all amplitude components, including those of any interferers, are normalized to a common value. That is, all signals have the same amplitude value and, therefore, the amplitudes of the interferers are now relatively inconsequential insofar are the correlation gain of the spread signal is concerned. The output of FFT 20 is a set of complex (real and imaginary) numbers representing the frequency components of the digitized waveform. By utilizing a rectangular-to-polar conversion, the signal is resolved into its magnitude and phase components. Since the SS signal information is contained solely in the phase component, the magnitude component is superfluous and is discarded. A polar-to-rectangular conversion, with the magnitude set to some arbitrary value (unity is convenient) is all that is required to return a normalized spectrum. Since there is no need to calculate any threshold or noise level, no overhead in computation is required. Every data point is operated on with no time delay (other than latency).

Mathematically, this process can be described as:

$$REAL_{OUT} = \cos[\arctan(IMAGINARY_{IN}/REAL_{IN})]$$

$$IMAGINARY_{OUT} = \sin[\arctan(IMAGINARY_{IN}/REAL_{IN})],$$

where the trigonometric functions are modulo 2 PI.

FFT circuitry 20 and IFFT circuitry 24 may be commercially available Plessey PDSP16150 Stand Alone Processors provided as either a single chip or a two or more cascaded chips.

Figure 4:
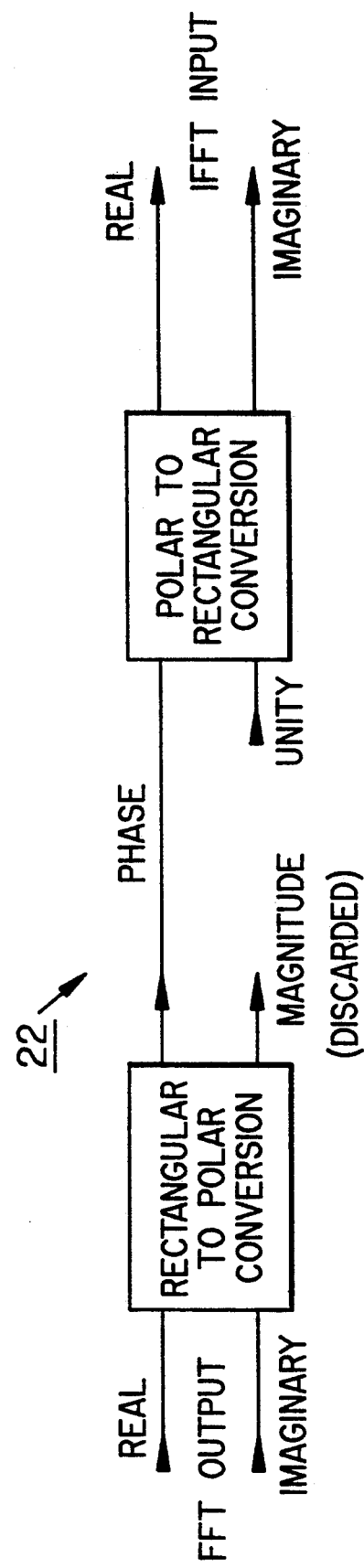
FIG. 4 is a block diagram of the excision portion of the system of FIG. 3.

FIG. 4 further illustrates the structure of excision circuitry 22 which is indicated can be implemented via a commercially available Plessey PDSP16330 Pythagoras Processors or, alternatively, a TRW TMC2330 Coordinate Transformers can be employed.

Improved performance is gained by incorporating windowing along with overlap and add architecture. The advantages of windowing data is a well known and well documented process. See IEEE "On Use of Windows for Harmonic Analysis with the Discrete Fourier Transform," by Frederick Harris, *Proceedings of the IEEE*, vol. 66, no. 1, pages 51-83, January 1978. It has been found that the Hamming window produces excellent results. The Hamming window has the benefit that, when utilized with a 50-percent overlap add architecture, the resultant time domain waveform has unity gain, although the add architecture imposes twice as much processing.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method for excising narrow band interferers in a spread spectrum signal communication, comprising the steps of:

(a) receiving said spread spectrum signal;
    (b) digitizing said spread spectrum signal;
    (c) transforming, in real time, said digitized signal from a time domain to a frequency domain, with said digitized signal having a magnitude;

(d) discarding, in real time, said magnitude of said digitized frequency domain signal and replacing it with a normalized value; and (e) transforming, in real time, said normalized signal back to said time domain.

2. A method, as defined in claim 1, wherein (d) comprises the steps of:

($d_1$) utilizing a rectangular-to-polar conversion to resolve said digitized frequency domain signal into its magnitude and phase components;

($d_2$) discarding said magnitude component; and ($d_3$) utilizing a rectangular-to-polar conversion with the magnitude set to an arbitrary value to return said digitized frequency domain signal to a normalized spectrum.

3. A method, as defined in claim 12 wherein step (c) is accomplished utilizing a Fast Fourier Transform.

4. A method, as defined in claim 1, where step (e) is accomplished utilizing an Inverse Fast Fourier Transform.

5. An apparatus for excising narrow band interferers in a spread spectrum signal communication, comprising:

(a) receiving means to receive said spread spectrum signal;

(b) digitizing means coupled to said receiving means to digitize said spread spectrum signal;

(c) first transforming means coupled to said digitizing means to transform, in real time, said digitized signal from a time domain to a frequency domain;

(d) rejection means coupled to said first transforming means to discard, in real time, the magnitude of said digitized frequency domain signal and replace it with a normalized value; and (e) second transforming means coupled to said rejection means to transform, in real time, said normalized signal back to said time domain.

6. An apparatus, as defined in claim 5, wherein said rejection means comprises:

($d_1$) first rectangular-to-polar conversion means to resolve said digitized frequency domain signal into its magnitude and phase components and to discard said magnitude component; and ($d_2$) second rectangular-to-polar conversion means with the magnitude set to an arbitrary value to return said digitized frequency domain signal to a normalized spectrum.

7. An apparatus, as defined in claim 5, wherein said first transforming means is a Fast Fourier Transform device.

8. An apparatus, as defined in claim 5, wherein said second transforming means is an Inverse Fast Fourier Transform device.

9. A method for excising narrow band interferers in a spread spectrum time domain signal communication, comprising the steps of:

(a) receiving said spread spectrum time domain signal;

(b) digitizing said spread spectrum time domain signal;

(c) transforming said digitized time domain signal from a time domain to a frequency domain;

(d) discarding the magnitude of said digitized signal and replacing it with a normalized value by:

($d_1$) utilizing a rectangular-to-polar conversion to resolve said digitized frequency signal into its magnitude and phase components;

($d_2$) discarding said magnitude component; and ($d_3$) utilizing a rectangular-to-polar conversion with the magnitude set to an arbitrary value to return said digitized frequency signal to a normalized spectrum; and (e) transforming said normalized signal back to said time domain.

10. A method, as defined in claim 9, wherein step (c) is accomplished utilizing a Fast Fourier Transform.

11. A method, as defined in claim 9, wherein step (e) is accomplished utilizing an Inverse Fast Fourier Transform.

12. An apparatus for excising narrow band interferers in a spread spectrum signal communication, comprising:

(a) receiving means to receive said spread spectrum signal;

(b) digitizing means coupled to said receiving means to digitize said spread spectrum signal;

(c) first transforming means coupled to said digitizing means to transform said digitized signal from a time domain to a frequency domain;

(d) rejection means coupled to said first transforming means to discard the magnitude of said digitized frequency signal and replace it with a normalized value through the use of ($d_1$) first rectangular-to-polar conversion means to resolve said digitized frequency signal into its magnitude and phase components and to discard said magnitude component; and ($d_2$) second rectangular-to-polar conversion means with the magnitude set to an arbitrary value to return said digitized signal to a normalized spectrum; and (e) second transforming means coupled to said rejection means to transform said normalized signal back to said time domain.

13. An apparatus, as defined in claim 12, wherein said first transforming means is a Fast Fourier Transform device.

14. An apparatus, as defined in claim 12, wherein said second transforming means is an Inverse Fast Fourier Transform device.

* * * * *

UNITED STATES PATENT AND TRADEMARK OFFICE
CERTIFICATE OF CORRECTION

PATENT NO. : 5,263,048
DATED : Nov. 16, 1993
INVENTOR(S) : Bobby R. Wade

It is certified that error appears in the above-indentified patent and that said Letters Patent is hereby corrected as shown below:

At column 5, line 12, and column 6, line 16, cancel "rectangular-to-polar" and insert therefor ---polar-to-rectangular---.

At column 6, line 40, cancel "first".

At column 6, line 44, cancel "second rectangular-to-polar" and insert therefor ---polar-to-rectangular---.

Signed and Sealed this

Twenty-eight Day of February, 1995

Attest:

BRUCE LEHMAN

Attesting Officer     Commissioner of Patents and Trademarks